(12) United States Patent
Balili et al.

(10) Patent No.: US 12,446,345 B2
(45) Date of Patent: Oct. 14, 2025

(54) SINGLE SENSOR, SINGLE PATH MULTIVIEW OR MULTI-BAND SENSING

(71) Applicant: GENTEX CORPORATION, Zeeland, MI (US)

(72) Inventors: Ryan B. Balili, Holland, MI (US); Adam R. Heintzelman, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 465 days.

(21) Appl. No.: 17/523,971

(22) Filed: Nov. 11, 2021

(65) Prior Publication Data

US 2022/0157872 A1      May 19, 2022

Related U.S. Application Data

(60) Provisional application No. 63/114,191, filed on Nov. 16, 2020.

(51) Int. Cl.
| | |
|---|---|
| *H10F 39/00* | (2025.01) |
| *G02B 5/30* | (2006.01) |
| *G02F 1/137* | (2006.01) |
| *H04N 23/20* | (2023.01) |
| *H10F 39/18* | (2025.01) |

(52) U.S. Cl.
CPC ....... *H10F 39/8063* (2025.01); *G02B 5/3016* (2013.01); *G02B 5/3025* (2013.01); *G02F 1/13718* (2013.01); *H04N 23/20* (2023.01); *H10F 39/184* (2025.01)

(58) Field of Classification Search
None
See application file for complete search history.

(56) References Cited

U.S. PATENT DOCUMENTS

| | | | |
|---|---|---|---|
| 11,092,491 B1* | 8/2021 | Powell | G01J 3/0208 |
| 2017/0140221 A1* | 5/2017 | Ollila | G06V 40/19 |
| 2018/0316859 A1* | 11/2018 | Saenger Nayver | G02F 1/137 |

FOREIGN PATENT DOCUMENTS

| | | | |
|---|---|---|---|
| JP | 2001285678 A | * | 10/2001 |
| JP | 2003259165 A | | 9/2003 |

OTHER PUBLICATIONS

International Search Report dated Feb. 17, 2022, for corresponding PCT application No. PCT/US2021/058887, 3 pages.

(Continued)

*Primary Examiner* — Phu Vu
(74) *Attorney, Agent, or Firm* — Price Heneveld LLP; Brian James Brewer (57) ABSTRACT

An imaging system may comprise: an image sensor; a first lens having a first field of view; a second lens having a second field of view; a multi-band pass filter capable of filtering light by allowing light having a first wavelength and light having a second wavelength to pass through; at least one cholesteric liquid crystal pair, each of the at least one cholesteric liquid crystal pairs tuned to one of the first and second wavelengths filtered by the multi-band pass filter; wherein the image sensor, the multi-band pass filter, the at least one cholesteric liquid crystal pairs, the first lens, and the second lens may be in optical communication with one another; and wherein scenes captured by at least one of the first and second lenses may be transmitted to the image sensor.

3 Claims, 4 Drawing Sheets

(56) References Cited

OTHER PUBLICATIONS

Written Opinion dated Feb. 17, 2022, for corresponding PCT application No. PCT/ US2021/058887, 6 pages.
International Preliminary Report on Patentability dated May 16, 2023, for corresponding PCT application No. PCT/US2021/058887, 7 pages.

* cited by examiner

SINGLE SENSOR, SINGLE PATH MULTIVIEW OR MULTI-BAND SENSING

CROSS REFERENCE TO RELATED APPLICATIONS

This application claims the benefit of and priority to U.S. Provisional Patent Application No. 63/114,191, filed on Nov. 16, 2020, entitled Single Sensor, Single Path Multiview or Multi-band Sensing, the entire disclosure of which is hereby incorporated herein by reference.

FIELD OF THE DISCLOSURE

This disclosure relates generally to imaging systems, and in particular, to imaging systems having multiple lenses and a single sensor.

BACKGROUND

When using a system for both driver monitoring and iris scanning, it may be desirable to create multiple views with one image sensor. It may also be desirable to be able to non-mechanically but actively switch between bands of light within the spectral range sensitivity of a single camera sensor using only a single optical path to allow the capture of different images, such as images centered around the near-infrared and the infrared portions of the spectrum. It may also be desirable for the system to be compact and inexpensive to manufacture.

SUMMARY

According to an aspect, an imaging system may comprise: an image sensor; a first lens having a first field of view; a second lens having a second field of view; a multi-band pass filter capable of filtering light by allowing light having a first wavelength band and light having a second wavelength band to pass through; at least one cholesteric liquid crystal pair, each of the at least one cholesteric liquid crystal pairs tuned to one of the first and second wavelength bands filtered by the multi-band pass filter; wherein the image sensor, the multi-band pass filter, the at least one cholesteric liquid crystal pairs, the first lens, and the second lens may be in optical communication with one another; and wherein scenes captured by at least one of the first and second lenses may be transmitted to the image sensor.

The multi-band pass filter may allow light having wavelengths in at least one of the infrared and the near-infrared portions of the spectrum to pass through. The imaging system further may comprise a first light source configured to selectively illuminate the first field of view. The first light source may comprise light having a wavelength in one portion of the spectrum. The imaging system may further comprise a second light source having a wavelength in a second portion of the spectrum and configured to selectively illuminate the second field of view. The first light source may comprise light having a wavelength in one of the infrared and the near-infrared portion of the spectrum. The imaging system further may comprise a second light source having a wavelength in one of the infrared and the near-infrared portion of the spectrum and configured to selectively illuminate the second field of view. The first light source may comprise light having a wavelength in the near-infrared portion of the spectrum and the second light source may comprise light having a wavelength in the infrared portion of the spectrum. The imaging system further may comprise a processor in communication with the image sensor and configured to process image data received from the image sensor. The at least one lens may be disposed in a rearview assembly of a vehicle. The imaging system may be disposed in a rearview assembly of a vehicle. At least one of first lens and second lens may have an adjustable focal length.

According to another aspect, an imaging system may comprise an image sensor; a first lens having a first field of view, and configured to transmit images to the image sensor; a second lens having a second field of view and configured to transmit images to the image sensor; a circular polarizer; a multi-band-pass filter configured to allow at least light having a first wavelength and light having a second wavelength to pass through the multi-band pass filter; a first cholesteric liquid crystal tuned to the first wavelength allowed to pass through the multi-band pass filter; a second cholesteric liquid crystal tuned to the second wavelength allowed to pass through the multi-band pass filter; wherein the multi-band pass filter and the at least one cholesteric liquid crystal may be in optical communication with the first lens. At least one of the first lens and the second lens may have an adjustable focal point. The first wavelength may be in the infrared portion of the spectrum and the second wavelength may be in the near-infrared portion of the spectrum.

The system may further comprise a first light source configured to selectively illuminate the first field of view. The first light source may be configured to produce light having a wavelength in a first portion of the spectrum. The system may further comprise a second light source. The second light source may be configured to produce light having a wavelength in a second portion of the spectrum different from the first portion of the spectrum. The second light source may be configured to selectively illuminate the second field of view. The first light source may comprise light having a wavelength in the near-infrared portion of the spectrum and the second light source may comprise light having a wavelength in the infrared portion of the spectrum.

The system may further comprise a processor in communication with the image sensor and configured to process image data received from the image sensor. At least one of the first and second lenses may be disposed in a rearview assembly of a vehicle. At least one of the first and second lenses may have an adjustable focal length.

According to another aspect, an imaging system may comprise at least one cholesteric liquid crystal pair; a lens stack; and an image sensor in optical communication with the lens stack. Each of the at least one cholesteric liquid crystal pairs may have a first state and a second state. The first state of each of the at least one cholesteric liquid crystal pairs may be configured to allow light having wavelengths within a particular wavelength band to pass through; and the second state of each of the at least one cholesteric liquid crystal pairs may be configured to reflect light having wavelengths within the particular wavelength band. The imaging system may further comprise a processor. The image sensor may be configured to transmit images from a captured scene to the processor and the processor may be configured to process the image data. The imaging system may further comprise a first light source configured to emit light having a first particular wavelength; and the first particular wavelength may correspond to the particular wavelength of a first pair of the at least one cholesteric liquid crystal pairs. The imaging system may further comprise a second light source configured to emit light having a second particular wavelength; and the second particular wavelength may correspond to the particular wavelength of a second pair of the at least one cholesteric liquid crystal pairs.

According to another aspect, a method of capturing a scene and transmitting image data related to the captured scene for processing, may comprise: transmitting light through a multi-band pass filter configured to allow light in certain spectral bands to pass through; transmitting the light through at least one cholesteric liquid crystal configured to allow only light having certain circular polarizations to pass through; capturing, by a first lens having a first field of view, a scene within the first field of view; and transmitting at least a portion of the scene to an image sensor; wherein the multi-band pass filter, the at least one cholesteric liquid crystal, and the first lens may be in optical communication with the image sensor.

The method further may comprise transmitting, by the image sensor, image data from the captured scene to a processor. The method further may comprise processing, by the processor, the image data transmitted by the image sensor. The method further may comprise illuminating, with a first light source having a first wavelength, the first field of view. The method further may comprise capturing, by a second lens having a second field of view, a scene within the second field of view and transmitting the scene to the image sensor. The method further may comprise illuminating, with a second light source having a second wavelength, the second field of view. The multi-band pass filter, the at least one cholesteric liquid crystal, the first lens, and the image sensor may be disposed within a rearview assembly of a vehicle.

DETAILED DESCRIPTION

An imaging system in accordance with this disclosure may use a single image sensor with a plurality of lenses capable of having different fields of view and/or different focal distances, thereby allowing the single image sensor to capture scenes in different fields of view. The imaging system may further be configured to use different wavelengths of light in capturing the different scenes and, in some embodiments, may be characterized by a single path switchable between two or more different wavelengths of light and two or more different views. Although configured to capture scenes in two different fields of view, the imaging system may take up less space than two separate imaging systems. For example, the arrangement of the components of the imaging system may allow the imaging system to use a single image sensor for capturing two or more images having two or more different fields of view, each field of view having a different size, and differing in distance from the imaging system. In some embodiments, each field of view may face the same general direction. For example, an imaging system may be used for both biometric identification of a user, such as iris- or facial-recognition, and for monitoring selected attributes of the user, such as, for example, a driver monitoring system configured to capture blink rate and/or blink speed, pulse rate and the like. In another example, a component arrangement may allow the imaging system to capture a scene in a first field of view distant from the imaging system and in a second, closer field of view, such as a rearview display system in a vehicle showing objects to the rear of the vehicle in the distance and a back-up camera system showing a scene immediately to the rear of the vehicle.

Figure 1:
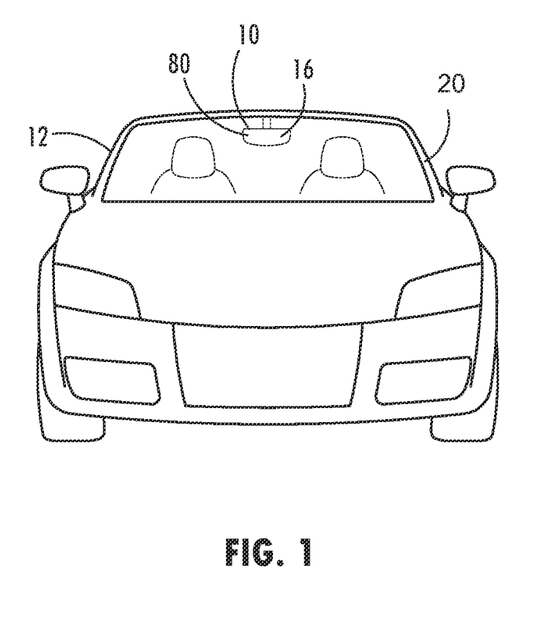
FIG. 1 illustrates a vehicle having an imaging system in accordance with this disclosure.

Referring to FIG. 1, the imaging system, generally indicated at 10, may be disposed within a vehicle 12. In particular, in some embodiments, at least some components of imaging system 10 may be disposed within a rearview assembly 16 of vehicle 12. However, imaging system 10 or various components of imaging system 10 may be disposed in locations other than rearview assembly 16 of vehicle 12 and still remain within the scope of this disclosure. In some embodiments, some components of imaging system 10 may be disposed within rearview assembly 16 of vehicle 12 while other components may be disposed in suitable locations within or on vehicle 12 such as in a vehicle pillar 20, a vehicle dashboard (not shown) or an infotainment console (not shown). The components disposed in other locations may be in communication with those components of imaging system 10 disposed within rearview assembly 16 of vehicle 12. The components may be arranged to allow imaging system 10 to capture scenes of at least one of a driver, characteristics and/or attributes of the driver, at least a portion of the interior of the vehicle cabin, and a forward-facing and/or rear-facing view of the exterior of vehicle 12.

Figure 2A:
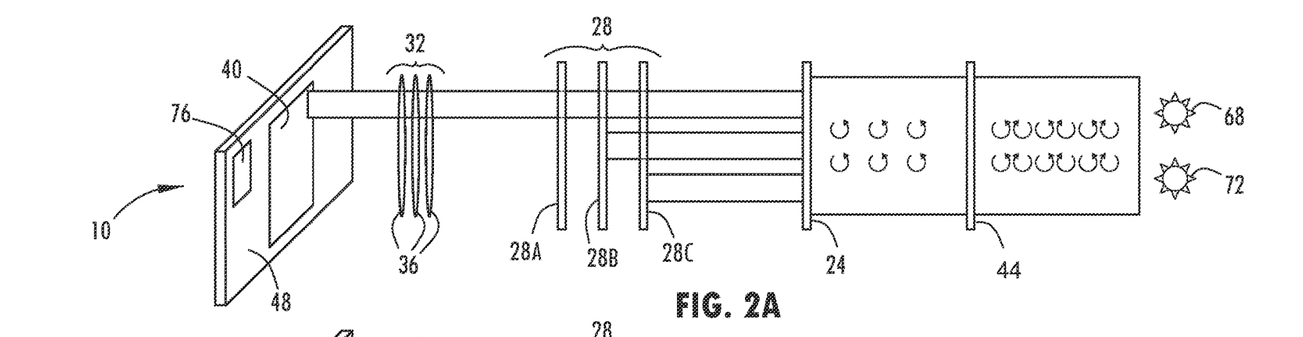
FIG. 2A illustrates a first embodiment of the imaging system of FIG. 1, with a first cholesteric liquid crystal in a second state.
Figure 2B:
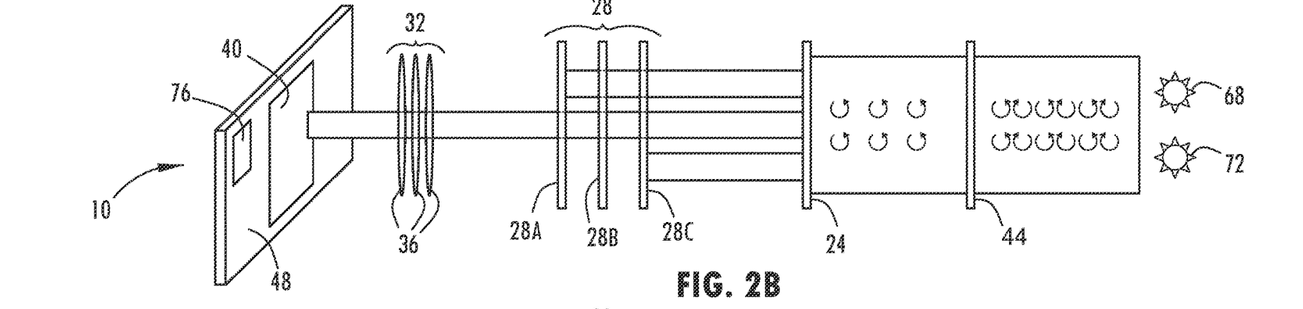
FIG. 2B illustrates the first embodiment of the imaging system of FIG. 1, with a second cholesteric liquid crystal in the second state.
Figure 2C:
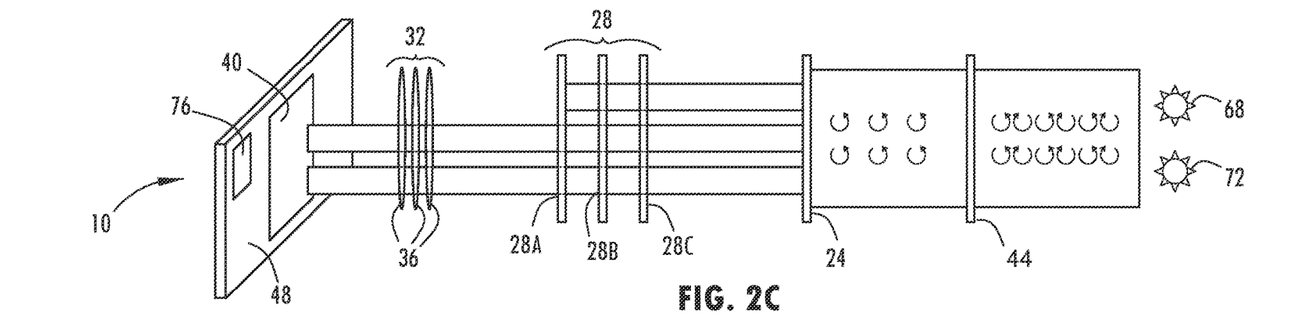
FIG. 2C illustrates the first embodiment of the imaging system of FIG. 2, with second and third cholesteric liquid crystals in the second state.

Referring now to FIGS. 2A-2C, in some embodiments, imaging system 10 may comprise a multi-band pass filter or filter stack 24, at least one cholesteric liquid crystal 28, a lens stack 32 comprising at least one lens 32, and an image sensor 40. Multi-band pass filter 24, the at least one cholesteric liquid crystal 28, and the at least one lens 36 may all be in optical communication with one another. Additionally, image sensor 40 may also be in optical communication with multi-band pass filter 24, the at least one cholesteric liquid crystal 28, and the at least one lens 36. In some embodiments, imaging system 10 may further comprise at least one circular polarizer 44 configured to polarize light in a first polarization direction. The at least one circular polarizer 44 may also be in optical communication with the at least one lens 36.

Multi-band pass filter or filter stack 24 may be configured to allow light having wavelengths in only pre-selected spectral bands to pass through and may prevent light having wavelengths outside the pre-selected spectral bands from passing through and ultimately reaching image sensor 40.

Each of the at least one cholesteric liquid crystals 28 may be "tuned" or configured to selectively reflect or to allow a particular spectral band to pass through. Each cholesteric liquid crystal 28 may have a first state and a second state. In the first state, cholesteric liquid crystal 28 may be configured to reflect light having a wavelength within the particular spectral band of the cholesteric liquid crystal and of the first polarization direction. In the second state, cholesteric liquid crystal 28 may be configured to allow light having a wavelength within the selected spectral band to pass through.

A first cholesteric liquid crystal 28 may be tuned to a different spectral band than a second cholesteric liquid crystal 28. For example, a first cholesteric liquid crystal 28 may be tuned to selectively reflect or allow light having wavelengths in a first spectral band to pass through while preventing the passage of light having other wavelengths. Continuing the example, a second cholesteric liquid crystal 28 may be tuned to selectively reflect or allow light having wavelengths in a second spectral band to pass through while preventing the passage of light having other wavelengths which may include light having wavelengths in the first spectral band. Each of the spectral bands that one of the at least one cholesteric liquid crystals 28 is tuned to may correspond to one of the spectral bands that multi-band pass filter 24 is configured to allow to pass through.

Lens stack 32 may comprise one or more lenses 36. In some embodiments, lens stack may have one focal length and be tuned to one field of view. In some embodiments, lens stack 32 may be configured to function as a zoom lens and may have variable focal lengths and/or variable fields of view. Lens stack 32 may be configured to adjust to selectively capture scenes in two or more different fields of view. A first field of view may partially or completely coincide with a second field of view or it may be completely separate from the second field of view. The second field of view may be larger or smaller than the first field of view. In addition, the focal lengths of the different fields of view may differ from one another or may be the same as each other. A focal length of a second field of view may be the same as a focal length of a first field of view (first focal length), longer than the first focal length, or shorter than the first focal length. For example, lens stack 32 may be configured to be operable to capture scenes in a first field of view and having a first focal length within a few inches from lens stack 32 such as an image of a user's iris when the iris is in proximity to lens stack 32. Lens stack 32 may also be operable to capture scenes in a second field of view having a second focal length several feet from lens stack 32 such as an image of an occupant of the vehicle driver's seat or part of all of the interior of the vehicle cabin.

Image sensor 40 may comprise, for example, active pixel sensors in complementary metal-oxide semiconductor (CMOS) devices or a charge-coupled device (CCD) capable of creating image data based on light and other signals received by image sensor 40 when activated. In some embodiments, imaging sensor may be disposed on a printed circuit board 48.

Lens stack 32 may be configured to be in selective optical communication with image sensor 40 and the scenes captured by lens stack 32 may be transmitted from lens stack 32 to image sensor 40.

In operation, as shown in FIGS. 2A-2C, in some embodiments, light may enter imaging system 10 and pass through circular polarizer 44 where the light is polarized in the first direction. Light having wavelengths within desired spectral bands is allowed to pass through multi-band pass filter 24, while light having other wavelengths is prevented from passing through multi-band pass filter 24. Desired spectral bands may be centered, for example, around about 810 nm or near-infrared light and about 940 nm or infrared light although multi-band pass filters configured to allow other wavelengths to pass through may be used and still be within the scope of this disclosure.

Each of the at least one cholesteric liquid crystals 28 may be tuned to one of the desired spectral bands allowed to pass through multi-band pass filter 24. Cholesteric liquid crystals 28 in the first state may be configured to reflect and polarize light that comprises wavelengths in the desired spectral band to which cholesteric liquid crystal 28 is tuned, and in the second state allow the light to pass through. Each of the at least one cholesteric liquid crystals 28 may polarize light by reflection, reflecting one direction of polarization and passing another direction. If the incident light band that is tuned to the cholesteric liquid crystal band is already circularly polarized in the same handedness as the cholesteric liquid crystal 28, that band of light is reflected. Light with opposite circular polarization or chirality to the cholesteric liquid crystal 28 and outside the specified band tuning of the cholesteric liquid crystal 28 passes through.

In FIG. 2A, multi-band pass filter 24 is configured to allow light having wavelengths within one of three spectral bands to pass through. First cholesteric liquid crystal 28A is in the second state, and allows light having a wavelength in a first of the desired spectral bands to pass through cholesteric liquid crystal 28 to lens stack 32 and image sensor 40. Second and third cholesteric liquid crystals 28A, 28B are in the first state, reflecting light having wavelengths in the second and third desired spectral bands, thereby preventing the light having those wavelengths from reaching image sensor 40. After light passes through first cholesteric liquid crystal 28A, the light may further pass through lens stack 32 and to image sensor 40 for the capture of the scene and the creation of image data.

In FIG. 2B, second cholesteric liquid crystal 28B is in the second state, and light having a wavelength in a second spectral band may pass through cholesteric liquid crystal 28 to lens stack 32 and image sensor 40. First and third cholesteric liquid crystals 28A, 28C are in the first state and reflect light having wavelengths in the first and third desired spectral bands in the second direction, thereby preventing it from passing through. After light passes through second cholesteric liquid crystal 28B, the light may further pass through lens stack 32 and to image sensor 40 for the capture of the scene and the creation of image data In like manner, in FIG. 2C, both second and third cholesteric liquid crystals 28B, 28C are in the second state and may allow light having wavelengths within the second and third desired spectral bands to pass through. After light passes through second and third cholesteric liquid crystals 28B, 28C, the light may further pass through first and second lenses 36A, 36B of lens stack 32 and to image sensor 40 for the capture of the scene and the creation of image data. First cholesteric liquid crystal 28A is in the first state, and may reflect light having a wavelength with a first spectral band, thereby preventing the light from reaching image sensor 40.

As shown, the components of imaging system 10 are in a particular order, but other arrangements may be used and still be within the scope of this disclosure. For example, circular polarizer 44 may be placed between multi-band pass filter 24 and at least one cholesteric liquid crystal 28.

Figure 3:
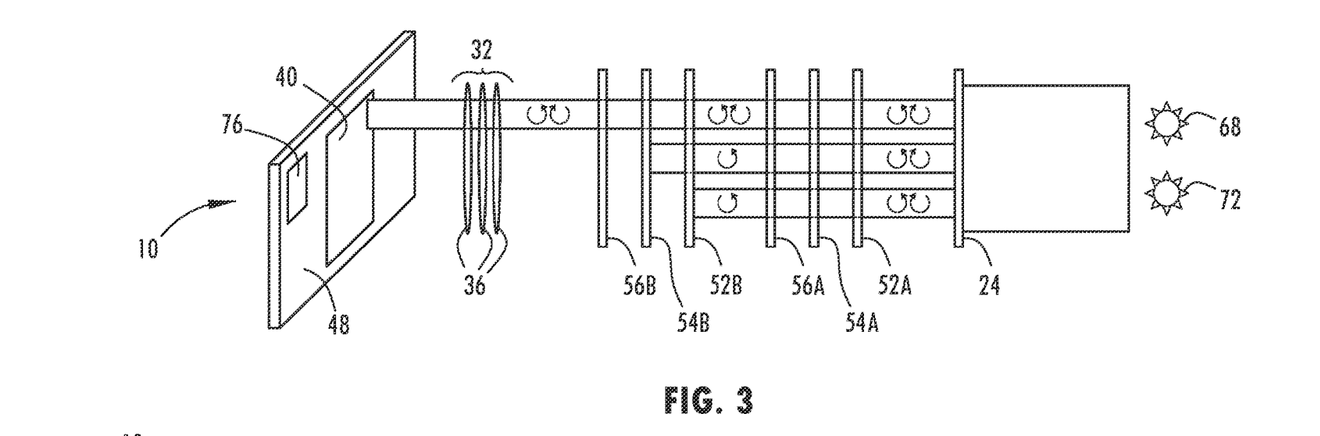
FIG. 3 illustrates a second embodiment of the imaging system of FIG. 1.

Referring now to FIG. 3, in some embodiments, imaging system 10 may comprise a multi-band pass filter 24, at least one cholesteric liquid crystal pair 52, 54, 56, each pair made up of two cholesteric liquid crystals 52A, 52B, 54A, 54B, 56A, 56B, a lens stack 32 comprising at least one lens 36, and an image sensor 40. Multi-band pass filter 24, the at least one cholesteric liquid crystal pair 52, 54, 56, and the at least one lens 36 may all be in optical communication with one another. Additionally, image sensor 40 may also be in optical communication with multi-band pass filter 24, the at least one cholesteric liquid crystal pair 52, 54, 56, and the at least one lens 36.

Image sensor 40, multi-band pass filter 24, the at least one cholesteric liquid crystal pair 52, 54, 56, and the at least one lens 36 may be disposed in various arrangements. For example, in some embodiments, imaging system 10 may be configured to allow light to pass first through multi-band pass filter 24, at least one cholesteric liquid crystal pair 52, 54, 56, a lens stack 32, and finally to image sensor 40.

Although the components are shown in a particular order, the arrangement of the components may be changed and remain within the scope of this disclosure. For example, the cholesteric liquid crystal pairs 52, 54, 56 may be arranged with the right and the left cholesteric liquid crystal of each wavelength adjacent to one another or with all the right cholesteric liquid crystals adjacent to one another and all the left cholesteric crystals adjacent to one another, although other arrangements are possible.

Each pair 52A, 54A, 56A, 52B, 54B, 56B of cholesteric liquid crystal pairs 52, 54, 56 may be tuned to a particular wavelength. In other words, both the first and the second cholesteric liquid crystals 52A, 52B of first cholesteric liquid crystal pair 52 may be tuned to the same wavelength, while the first and second cholesteric liquid crystals 54A, 54B of second cholesteric liquid crystal pair 54 may be tuned to the same wavelength as each other, although the wavelength to which the second cholesteric liquid crystal pair 54 is tuned may be different from the wavelength to which first cholesteric liquid crystal pair 52 is tuned.

The first cholesteric liquid crystal 52A, 54A, 56A of each pair may have a first state in which the first cholesteric liquid crystals 52A, 54A, 56A may each be configured to reflect light having the first polarization direction and the particular wavelength to which each of the first cholesteric liquid crystals 52A, 54A, 56A has been tuned, thereby leaving only light of the particular wavelength polarized in a second direction passing through first cholesteric liquid crystal 52A, 54A, 56A. First cholesteric liquid crystals 52A, 54A, 56A may also have a second state in which light of the particular wavelength is passed through without being reflected by cholesteric liquid crystals 52A, 54A, 56A. Similarly, the second cholesteric liquid crystals 52B, 54B, 56B of each cholesteric liquid crystal pair 52, 54, 56 may have a first state in which the second cholesteric liquid crystals 52B, 54B, 56B are configured to selectively reflect light having the particular wavelength to which each of the first cholesteric liquid crystals 52A, 54A, 56A have been tuned and having polarization in a second direction. Second cholesteric liquid crystals 52B, 54B, 56B of second cholesteric liquid pair may also have a second state in which light of the particular wavelength is selectively passed through second cholesteric liquid crystals 52B, 54B, 56B. The second polarization direction may be different from, and may be opposite to, first polarization direction. For example, first polarization direction or chirality may be to the right-handed and second direction may be to the left-handed or vice versa.

Thus, when both the first and the second cholesteric liquid crystals 52A, 54A, 56A, 52B, 54B, 56B of a pair 52, 54, 56 are in their first states, unpolarized light of the particular wavelength band that the cholesteric liquid crystal pair 52, 54, 56 is tuned to will be reflected in the first polarization direction, effectively circularly polarizing the transmitted light in the second polarization direction upon passing through first cholesteric liquid crystal 52A, 54A, 56A. Then, the light transmitted through first cholesteric liquid crystal 52A, 54A, 56 A which is now circularly polarized in the second direction upon reaching second cholesteric liquid crystal 52B, 54B, 56B will be reflected by the second liquid crystal. Effectively, no light of the particular wavelength may pass through to image sensor 40. However, when both cholesteric liquid crystals 52A, 54A, 56A, 52B, 54B, 56B of the pair are in their second states, light of the particular wavelength may pass through both cholesteric liquid crystals 52A, 54A, 56A, 52B, 54B, 56B of the pair 52, 54, 56 to image sensor 40. Image sensor 40 may be configured to generate image data from the received light.

Each pair 52, 54, 56 of cholesteric liquid crystals may be tuned to a different wavelength, thereby allowing imaging system 10 to control the passage of different wavelengths of light to image sensor 40. To illustrate, with continued reference to FIG. 3, light with a range of wavelengths and with both the right and the left circular polarization components enters imaging system 10. As shown, light first passes through multi-band pass filter 24, which allows only light within certain spectral bands to pass through. In some embodiments, the first spectral band may comprise light having wavelengths of about 810 nm or in the near infrared portion of the spectrum. In some embodiments, the second spectral band may comprise light having wavelengths of about 940 nm or light having wavelengths in the infrared portion of the spectrum. The light may further pass through at least one cholesteric liquid crystal pair 52, 54, 56. For example, in some situations, both cholesteric liquid crystals 52A, 52B, 54A, 54B, 56A, 56B of the at least one cholesteric liquid crystal pair 52, 54, 56 may be in the second state, and light having wavelengths within the spectral band to which the cholesteric liquid crystal pair 52, 54, 56 is tuned may pass through the pair 52, 54, 56.

After passing through first cholesteric liquid crystal 52A, 54A, 56A, the light may further pass through lens stack 32 to image sensor 40. In another example, at least one cholesteric liquid crystal pair 52, 55, 56 may be tuned to opposite states, with one cholesteric liquid crystal of the pair in the first state and the other in the second state. In yet another example, 52A may be in the first state, polarizing the incident light in the first direction of polarization. Then, the polarized light may pass through 52B which may be in the second state, thereby allowing light of circular polarization in the first direction and band selected by 52A to reach the image sensor 40. In another example, cholesteric liquid crystal 52A may be in the second state allowing light of all polarization to pass through. Cholesteric liquid crystal 52B may be in the first state, polarizing the incident light in the second direction thereby allowing light of circular polarization in the second direction and band selected by 52B to reach the image sensor 40. In another example, both cholesteric liquid crystals 52A, 52B, 54A, 54B, 56A, 56B of the at least a second of the one or more cholesteric liquid crystal pairs 52, 54, 56 may be in the first state. The first cholesteric liquid crystal 52A, 54A, 56A in each of the pairs may reflect light with circular polarization in the first direction, and the second cholesteric liquid crystal 52B, 54B, 56B in the pair may reflect the remaining light circularly polarized in the second direction, effectively preventing light having wavelengths within the spectral band for which the cholesteric liquid crystal pair 52, 54, 56 is tuned from passing to image sensor 40.

Figure 4:
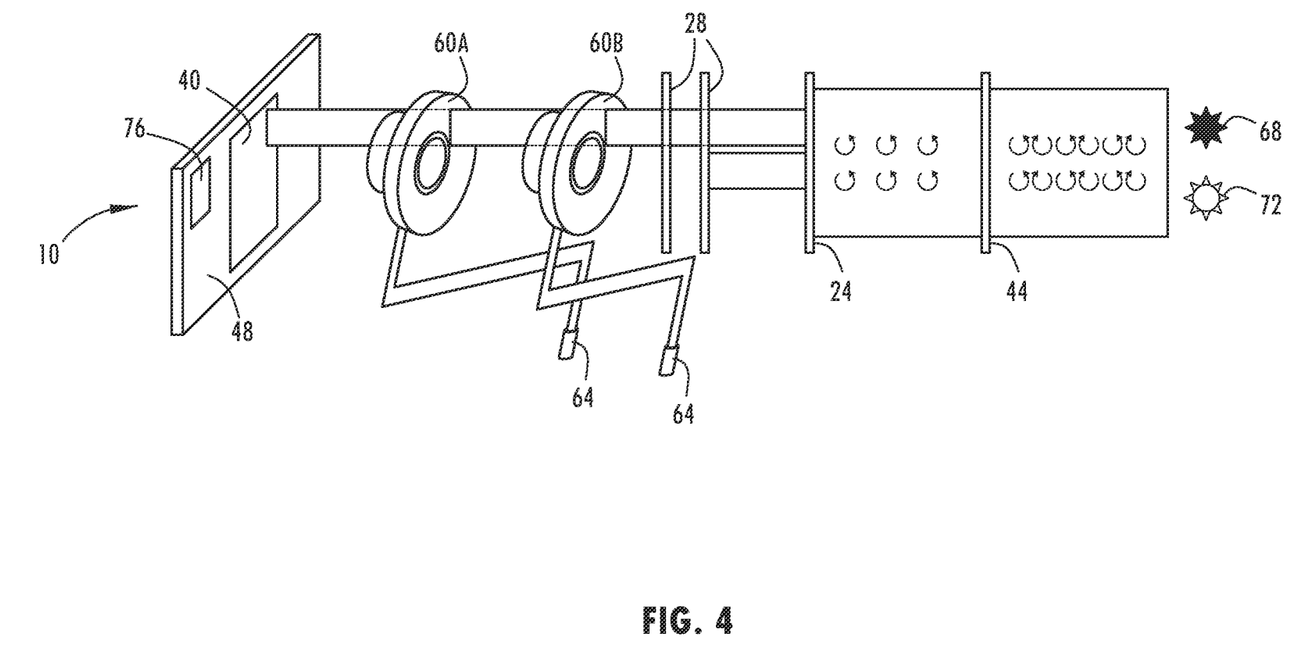
FIG. 4 illustrates a third embodiment of the imaging system of FIG. 1.

Referring now to FIG. 4, in some embodiments, imaging system 10 may comprise circular polarizer 44, multi-band pass filter 24, at least one cholesteric liquid crystal 28, at least one variable lens 60A, 60B, and image sensor 40. As described in the embodiments above, light may be filtered by multi-band pass filter 24 to allow only light having wavelengths within desired spectral bands through. Light may further be polarized in a first direction by circular polarizer 44. The at least one cholesteric liquid crystal 28 may selectively reflect light having wavelengths within certain spectral bands and polarized in a second direction opposite to first direction of polarization.

Each of the at least one variable lenses 60A, 60B may be operable to change from a first focal length to a second focal length. For example, first variable lens 60A may be configured to have a first focal length of infinity and a second focal length of about 4.8 mm. Second variable lens 60B may be configured to have a first focal length of about 11 mm and a second focal length of infinity. In the above example, when the focal length of first variable lens 60A is set to infinity, the focal length of second variable lens 60B may be set to 4.8 mm, and when the focal length of first variable lens 60A is set to 11 mm, the focal length of second variable lens 60B may be set to infinity. The at least one variable lens 60 may be in communication with a controller 64 configured to control the focal length of the at least one variable lenses 60.

Figure 5:
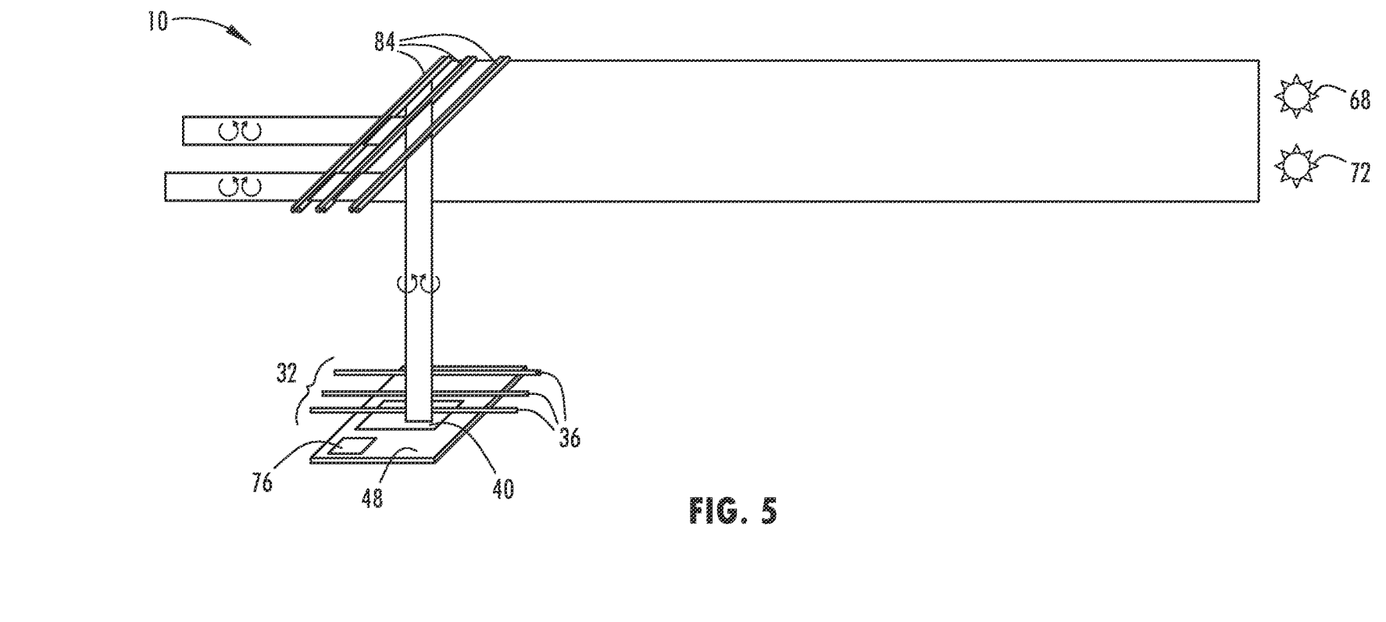
FIG. 5 illustrates a fourth embodiment of the imaging system of FIG. 1.

Referring now to FIG. 5, in some embodiments, imaging system 10 may comprise at least one combined right- and left-handed cholesteric liquid crystal pair 84, a lens stack 32 comprising one or more lenses 36, and an image sensor 40. Each combined cholesteric liquid crystal pair 84 may be tuned to a particular wavelength band. The particular wavelength band of one of the at least one cholesteric liquid crystal pairs 84 may be different than the wavelength band of the other cholesteric liquid crystal pairs 84. Each of the at least one combined cholesteric liquid crystal pairs 84 may have a first state and a second state. In the first state, light of the particular wavelength band that the cholesteric liquid crystal pair 84 is tuned to may pass through the cholesteric liquid crystal pair 84. In the second state, light of the particular wavelength band may be reflected in a different direction, and may be transmitted to lens stack 32. Image sensor 40 may be in optical communication with lens stack 32, and may be configured to generate image data from the received light.

As shown in FIGS. 2A-5, in some embodiments, imaging system 10 may be paired with a first light source 68 configured to emit light having a first particular wavelength. The wavelength of light emitted by first light source 68 may correspond to one of the wavelengths that multi-band pass filter 24 is configured to allow to pass through. The wavelength may be, for example, about 810 nm (near-infrared light) or about 940 nm (infrared light), although other wavelengths may be used and still be within the scope of this disclosure. In some embodiments, first light source 68 may be configured to illuminate objects within the first field of view, thereby allowing for the capture of scenes in the field of view.

In some embodiments, imaging system 10 may additionally or alternatively be paired with a second light source 72 configured to emit light having a second particular wavelength. The wavelength of light emitted by second light source 72 may correspond to one of the wavelengths that may pass through multi-band pass filter 24. As in the example above, the wavelength may be about 810 nm or about 940 nm. The light from second light source 72 may be configured to shine on objects or people within the second field of view.

In some embodiments, imaging system 10 may be configured to shine near-infrared light from first light source 68 during a driver authentication process, and may be disposed to allow imaging system 10 to capture images of a characteristic, such as an iris, of a user when the user characteristic is within the first field of view. In some embodiments, imaging system 10 may be configured to shine infrared light from second light source 72 on a driver of vehicle 12 during operation of vehicle 12 to enable imaging system 10 to capture a scene to be used for driver monitoring.

In some embodiments, imaging system 10 may further comprise a processor 76. Image sensor 40 may be configured to transmit image data from the captured scene to processor 76. Processor 76 may be configured to receive and process image data from captured scenes. For example, during a driver authentication process, image data from the captured scene may be transmitted to the processor 76. Processor 76 may be configured to compare the image data from the captured scene with stored image data to determine whether the captured image data matches the stored image data. The stored image data may be from a previously captured scene. In another example, during a driver monitoring operation, processor 76 may be configured to process image data from the captured scene and determine, for example, whether the driver is showing signs of fatigue or distraction.

Processor 76 may be disposed on printed circuit board 48. Processor 76 may be further in communication with at least one additional system of vehicle 12 and may be configured to selectively cause at least one vehicle system to generate instructions and/or to execute an action in response to input received from processor 76.

A method of capturing a scene and transmitting image data related to the captured scene for processing may comprise transmitting light through a multi-band pass filter configured to allow light in certain spectral bands to pass through. The method may further comprise transmitting the light through at least one cholesteric liquid crystal configured to allow only light having certain circular polarizations to pass through. The method may further comprise capturing, by a first lens having a first focal point and a first field of view, a scene within the first field of view. The method may further comprise transmitting at least a portion of the scene to an image sensor. The multi-band pass filter, the at least one cholesteric liquid crystal, and the first lens may be in optical communication with the image sensor.

The method may further comprise transmitting, by the image sensor, image data from the captured scene to a processor. The method may further comprise processing, by the processor, the image data transmitted by the image sensor. The method may further comprise illuminating, with a first light source having a first wavelength, the first field of view. The method may further comprise capturing, by a second lens having a second field of view, a scene within the second field of view and transmitting the scene to the image sensor. The method may further comprise illuminating, with a second light source having a second wavelength, the second field of view. The first wavelength may be in the infrared portion of the spectrum and the second wavelength may be in the near-infrared portion of the spectrum. The multi-band pass filter, the at least one cholesteric liquid crystal, the first lens, and the image sensor may be disposed within a rearview assembly of a vehicle.

As used herein, a "rearview assembly" is a structure that may provide an image of a scene to the rear of a driver. In general, rearview assemblies include a housing 80 that may have a wide variety of possible designs. Rearview assemblies may also include at least one of a rearview device and a video display element, mounted in housing 80, and a mounting element that attaches housing 80 to vehicle 12.

Rearview assembly 16 may additionally or alternatively include an electronic display that displays an image as sensed by a rearward facing camera or other imaging system 10. Rearview assembly 16 may include both an electro-optic rearview assembly and a display device for providing an image from a rearward facing camera or other imaging system 10. Thus, a "rearview assembly" need not include a mirror element. Rearview assembly 16 may include a mounting element and may be designed for mounting directly to the vehicle windshield. Alternatively, rearview assembly 16 may be designed for mounting to the roof of vehicle 12.

It will be understood that the term "electro-optic" will be defined herein, regardless of its ordinary meaning, as a material that exhibits a change in its extinction coefficient at one or more wavelengths upon exposure to a particular electrical potential difference. Electro-optic components include materials whose color or opacity are affected by electric current, such that when an electrical current is applied to the material, the color or opacity change from a first phase to a second phase.

As discussed herein, the terms identification and authentication may generally refer to an analysis completed by the imaging system 10 configured to identify the occupant or a potential occupant of vehicle 12. The disclosure provides for various embodiments configured to provide at least one authentication routine configured to securely indicate an identity of the occupant. Accordingly, the authentication may provide for an identification of an authenticated occupant and grant access and/or privileges to modify or control various features of the vehicle 12. In some embodiments, the system may similarly be configured to access an identification profile configured to provide for the authentication of the occupant.

In this document, relational terms, such as first and second, top and bottom, front and back, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. As used herein, the term "about" means slightly more or less than the stated amount such as within 10%, within 5%, within 2%, within 1%.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

The invention claimed is:

1. An imaging system, comprising:
   first and second cholesteric liquid crystal pairs;
   a lens stack including at least first and second lenses aligned in a single optical path and having different first and second fields of view, respectively;
   an image sensor in optical communication with the lens stack;
   a first light source configured to selectively illuminate the first field of view, the first light source configured to emit light having a first particular wavelength;
   a second light source configured to selectively illuminate the second field of view, the second light source configured to emit light having a second particular wavelength different from the first particular wavelength;
   wherein each of the cholesteric liquid crystals of each of the first and second cholesteric liquid crystal pairs has a first state and a second state;
   wherein the first state of each of the cholesteric liquid crystals is configured to allow light having wavelengths within a particular wavelength band to pass through; and
   wherein the second state of each of the cholesteric liquid crystals is configured to reflect light having wavelengths within the particular wavelength band, wherein the first cholesteric liquid crystal pair is tuned to the first particular wavelength and the second cholesteric liquid crystal pair is tuned to the second particular wavelength.

2. The imaging system of claim 1, further comprising a processor;
   wherein the image sensor is configured to transmit image data from images from a captured scene to the processor; and
   wherein the processor is configured to process the image data.

3. The imaging system of claim 1, wherein the first particular wavelength is in the infrared portion of the spectrum and the first field of view corresponds to a scene used for driver monitoring and the second particular wavelength is in the near-infrared portion of the spectrum and the second field of view corresponds to a scene used for a driver authentication process.

* * * * *